US00RE42176E

(19) United States
(12) Reissued Patent
Giro Amigo

(10) Patent Number: US RE42,176 E
(45) Date of Reissued Patent: Mar. 1, 2011

(54) MACHINE FOR MANUFACTURING, FILLING AND CLOSING MESH BAGS FROM A CONTINUOUS ROLL OF TUBULAR MESH

(75) Inventor: Ezequiel Giro Amigo, Badalona (ES)

(73) Assignee: Girnet Internacional, S.L., Badalona (ES)

(21) Appl. No.: 12/203,780

(22) Filed: Sep. 3, 2008

Related U.S. Patent Documents

Reissue of:

(64) Patent No.: 7,100,658
Issued: Sep. 5, 2006
Appl. No.: 10/839,172
Filed: May 6, 2004

(30) Foreign Application Priority Data

May 30, 2003 (ES) ..... 200301284

(51) Int. Cl.

| | |
|---|---|
| ***B29C 65/02*** | (2006.01) |
| ***B29C 65/18*** | (2006.01) |
| ***B32B 37/04*** | (2006.01) |
| ***B31B 1/16*** | (2006.01) |
| ***B31B 49/04*** | (2006.01) |
| ***B31B 1/14*** | (2006.01) |
| ***B31B 1/90*** | (2006.01) |

(52) U.S. Cl. ..... 156/496; 156/510; 156/538; 156/556; 493/189; 493/199; 493/217; 493/227; 493/394; 53/138.3; 53/547; 53/554; 53/560; 53/567; 53/570; 53/575

(58) Field of Classification Search ..... 156/381, 156/383, 391, 494–496, 510, 538, 556, 557, 156/559; 493/186, 189, 199, 210, 217, 227, 493/394; 53/138.1, 138.3, 545, 547, 548, 53/553, 554, 558–560, 567, 570, 574, 575; 40/124.191

See application file for complete search history.

(56) References Cited

U.S. PATENT DOCUMENTS

| | | | | | |
|---|---|---|---|---|---|
| 3,334,466 | A | * | 8/1967 | Scholle | 53/451 |
| 3,390,617 | A | * | 7/1968 | Cloud et al. | 493/194 |
| 4,091,595 | A | * | 5/1978 | Pelster et al. | 53/417 |
| 4,230,030 | A | * | 10/1980 | Hanson et al. | 493/194 |
| 4,579,154 | A | * | 4/1986 | Muller | 141/59 |
| 4,922,683 | A | * | 5/1990 | Connolly | 53/296 |
| 5,024,049 | A | * | 6/1991 | Strub et al. | 53/585 |
| 5,466,210 | A | * | 11/1995 | Wilcox | 493/309 |
| 6,651,406 | B2 | * | 11/2003 | Sperry et al. | 53/403 |
| 6,966,164 | B2 | * | 11/2005 | Navarro et al. | 53/399 |
| 2001/0049924 | A1 | * | 12/2001 | Dauder Guardiola | 53/567 |

FOREIGN PATENT DOCUMENTS

| | | | | |
|---|---|---|---|---|
| DE | 2909479 | A | * | 9/1980 |
| EP | 844175 | A1 | * | 5/1998 |

OTHER PUBLICATIONS

English Abstract of DE 2,909,479.*

* cited by examiner

*Primary Examiner*—Philip C Tucker
*Assistant Examiner*—Sing P Chan
(74) *Attorney, Agent, or Firm*—Sughrue Mion, PLLC

(57) ABSTRACT

Machine for manufacturing mesh bags from a continuous roll of tubular mesh, and for filling and closing said mesh bags, which comprise an expansion device which is perimetric to the tubular mesh, the core expander of which is equipped with a vertical aperture which, as if it were a slot, traverses said core expander and connects the two frontal faces thereof and extends from its base to an intermediate point, for which the core expander adopts an inverted "U" shape, the machine also being fitted with preventive welding means, adapted for partially welding the two frontal faces of the tubular mesh and, as the case may be, the adjoining laminates of thermally weldable material through the aperture of the core expander; a traction device which drags a section of the tubular mesh provided with a bottom; conveyor means; and second and third filling and closing stations, respectively, both being arranged linearly.

15 Claims, 4 Drawing Sheets

MACHINE FOR MANUFACTURING, FILLING AND CLOSING MESH BAGS FROM A CONTINUOUS ROLL OF TUBULAR MESH

Matter enclosed in heavy brackets [ ] appears in the original patent but forms no part of this reissue specification; matter printed in italics indicates the additions made by reissue.

TECHNICAL FIELD OF THE INVENTION

The invention relates to a machine for manufacturing mesh bags, made from portions cut from a continuous roll of tubular mesh, closed at its two ends, and for filling and closing said mesh bags, which are particularly suitable for packaging horticultural products, such as fruit and tubers.

BACKGROUND OF THE INVENTION

The known machines for the manufacture of continuous mesh bags are made up of tubular mesh feed devices and a first and second laminate of thermally weldable material and opening means of the tubular mesh, which comprise an expanding core arranged floating and vertically inside the tubular mesh and are supported by at least one pair of rotating rollers outside the mesh, the shafts of which are integral to the machine.

The machines also have one or several traction devices, made up, for example, of pairs of rollers which rotate in the opposite direction and between which the tubular mesh is forced to circulate in an upward or downward direction on the outside of the expanding core. Some machines are also provided with welding devices, in order to weld the laminates of thermally weldable material onto the tubular mesh as it passes through said expanding core and with devices for cutting the tubular mesh and closing the section which has been cut at the bottom, in order to thus make up a bag bottom.

The laminates of thermally weldable material are used to join the bag ends and make up the bottom thereof, as well as to close the bag after the filling thereof. In addition, the laminates are used to print the identifying data of the bag, its content or for advertising.

However, when the mesh is stretched by the traction devices, it frequently undergoes some kind of deformation, and that one of its faces, and the corresponding laminate of thermally weldable material, is displaced as regards the other face and corresponding laminate. In the event of there being equal or complementary information on the laminates adjoining the two faces of the tubular mesh, this effect leads to said information not matching when the tubular mesh and adjoining laminates are cut and then welded to make up the bag bottom or the subsequent closing thereof.

Progressively, and as the machine drags the tubular mesh in order to manufacture one bag after the other, this small difference in displacement between the laminates increases, in such a way that it is necessary to stop the machine in order to manually align the two laminates to be affixed to the two sides of the same bag.

In the event of the laminates having different colour printing for the bottom or the upper fastener, or should the laminates incorporate signs to be detected by optical readers and activate some sort of device on the machine, the non-alignment of the laminates can cause serious consequences, forcing the bag production to be stopped, as well as the filling and closing thereof, since the bags that are manufactured may be faulty.

Therefore, the need for a machine which allows for the continuous manufacture of mesh bags, which ensures the alignment of the adjoining laminates to the faces of the tubular mesh and which are an improvement on the current drag systems for mesh bags along a core expander is noted.

EXPLANATION OF THE INVENTION

The machine for manufacturing, filling and closing mesh bags from a continuous roll of tubular mesh preferably obtained from a reel, comprises a first bag-shaping station, provided with tubular mesh continuous feed devices and first and second laminates of thermally weldable material; an expansion device which is perimetric to the tubular mesh provided with a core expander with an essentially oblong and flattened configuration, to be inserted, floating and vertically, inside the tubular mesh, determining in said mesh as it passes through the core expander, two frontal faces and two lateral faces, and the first and the second laminates of thermally weldable material face and superimpose said frontal faces of the tubular mesh; welding devices arranged on both sides of the tubular mesh for the welding of each of the laminates of thermally weldable material to the face adjacent to the tubular mesh; and a bag-shaping device, equipped with a cross-sectional welding device to configure a bag bottom and a cross-sectional cutting mechanism arranged next to the cross-sectional welding mechanism.

In essence, the machine is characterised in that the core expander of the perimetric expansion device is equipped with a vertical aperture which, as if it were a slot, traverses the core expander and connects the two frontal faces thereof and extends from its base to an intermediate point for which the core expander adopts an inverted "U" shape, the machine being fitted with preventive welding means, situated on a level with the core expander, adapted for partially welding the two frontal faces of the tubular mesh and the adjoining laminates of thermally weldable material through the said aperture of the core expander; and in that the first station comprises a traction device which stretches the mesh downwards, so the thermally welded zone of the two frontal faces of the mesh moves along the core expander aperture, dragging a section of the tubular mesh provided with a bottom so that the tubular mesh and laminates of thermally weldable material adjoining are cut by the cutting mechanism, turning out an unclosed mesh bag which is delivered to the first conveyor means, which convey it towards a second filling station, wherefrom second conveyor means subsequently convey it to a third closing station, both being arranged linearly.

In accordance with a preferred embodiment, the cross section of the aperture in a vertical direction of the core expander has a widening at its far end.

In accordance with another characteristic of the machine, each of the welding devices arranged on both sides of the tubular mesh is provided with at least two welders arranged cross-sectionally and at the same level as regards the tubular mesh, in order to carry out the respective cross-sectional welds.

In accordance with another characteristic of the present invention, the traction device which stretches the tubular mesh downwards is made up of a pincer, adapted for holding the end of the tubular mesh provided with a bottom, said pincer being assembled on a carriage, displaceable in a vertical direction.

In accordance with another characteristic of the present invention, the aforementioned conveyor means consist of a pair of arms arranged on both sides of the section of tubular mesh provided with a bottom and which constitutes a mesh bag after being cut by the cross-sectional cutting mechanism, said arms being capable of joining together or separating and each of them being provided with at least one suction cup, so that when the arms join together said suction cups adhere to the thermally weldable laminates of both faces of the bag and when the arms separate the suction cups open the upper mouth of the bag, and in that the arms are assembled on a carriage, displaceable in a horizontal direction, which makes an alternative movement between the first bag shaping station and the second filling station, then, as the arms convey the bag towards the second station, the arms separate, thereby opening the upper mouth of the bag.

In accordance with another characteristic of the present invention, the second station comprises a pair of arms, capable of joining together and separating, each of them provided with a pincer to hold one of the walls of the mesh bag provided with thermally weldable laminate, keeping the mesh bag open when the arms are separated; lower support means of the mesh bag; and bag filling means of the bag by its open upper mouth.

In accordance with another characteristic of the present invention, the second conveyor means consist of third arms, capable of separating and joining together and adapted for holding by pressure, when joined together, the mesh bag of the second station, said arms being arranged below the second arms of the second station and the arms also being assembled on a second carriage displaceable in a horizontal direction, which makes an alternative movement between the second filling station and the third closing station.

It is also a characteristic of the invention the fact that the third station comprises a bag closing device, provided with a welding mechanism of the tubular mesh and the laminates of thermally weldable material adjoining the tubular mesh which constitute the mesh bag.

In a preferred embodiment, the welding mechanism of tubular mesh is provided with a tightening mechanism made up of two essentially flat plates which pinch and press the mesh bag mouth before, during and after the welding of the tubular mesh and laminates of thermally weldable material.

The invention is also characterised in that the bag closing device comprises a die mechanism, adapted for trimming the laminates of thermally weldable material and the welded tubular mesh to facilitate the holding of the bags.

It is also a characteristic of the machine object of the invention that the bag closing device comprises a mechanism adapted for providing the bag with a handle.

BRIEF DESCRIPTION OF THE DRAWINGS

An embodiment of the machine for manufacturing, filling and closing mesh bags from a continuous roll of tubular mesh is illustrated in the attached drawings, by way of non-limiting example, is. In said drawings.

DETAILED DESCRIPTION OF THE DRAWINGS

The machine object of the invention disclosed herein as an embodiment is provided with continuous feed devices of the tubular mesh 3, not represented, preferably obtained from a reel, and with first and second laminates 5 of thermally weldable material.

For an enhanced understanding, the different parts and components of the machine are not drawn to scale in order to be able to show to a greater extent the details of greatest interest.

Figure 2:
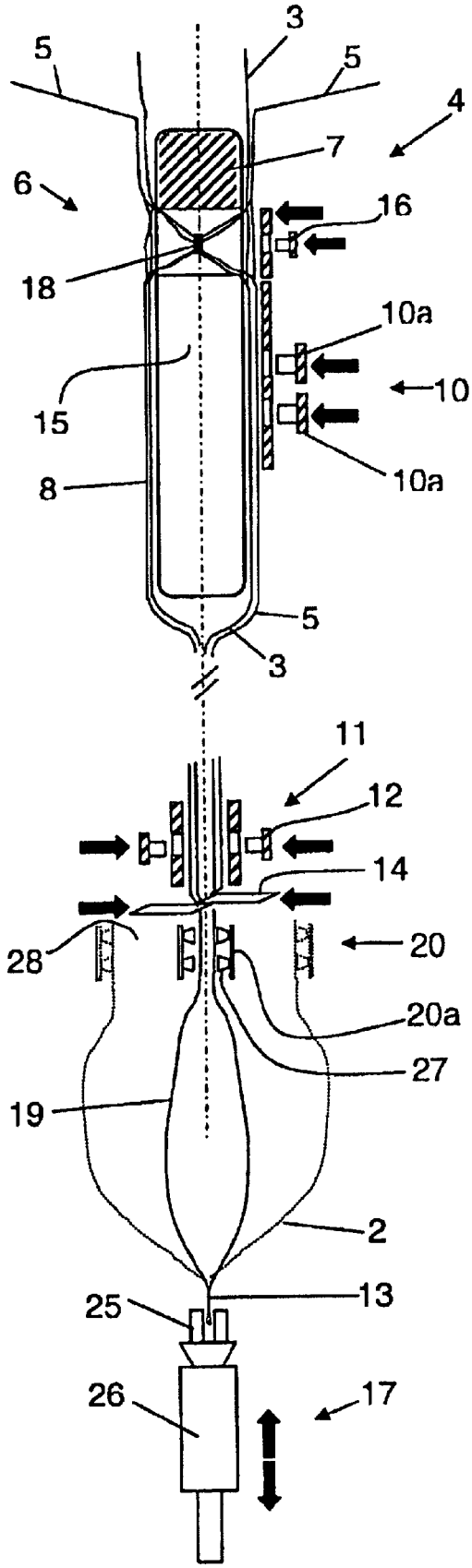
FIG. 2 is a lateral elevation view of the bag shaping station of the machine object of the invention, wherein the core expander in FIG. 1 is sectioned in accordance with II—II.

Thus, FIG. 2 is a lateral elevation view of the bag shaping station 4, wherein it can be appreciated that said shaping station 4 comprises a perimetric expansion device 6 which receives the tubular mesh 3. The expansion device is provided with a core expander 7, with an oblong and flattened configuration, which is inserted, floating and vertically, inside the tubular mesh 3. The core expander 7, supported by at least one pair of rotating rollers, not shown, determines in the tubular mesh 3, two frontal faces 8 and two lateral faces 9 as it passes through the aforementioned core expander.

In the example in FIG. 2, the first and second laminates of thermally weldable material 5, as they pass through the perimetric expansion device 6, remain facing and superimposing the frontal faces 8 of the tubular mesh 3.

Figure 1:
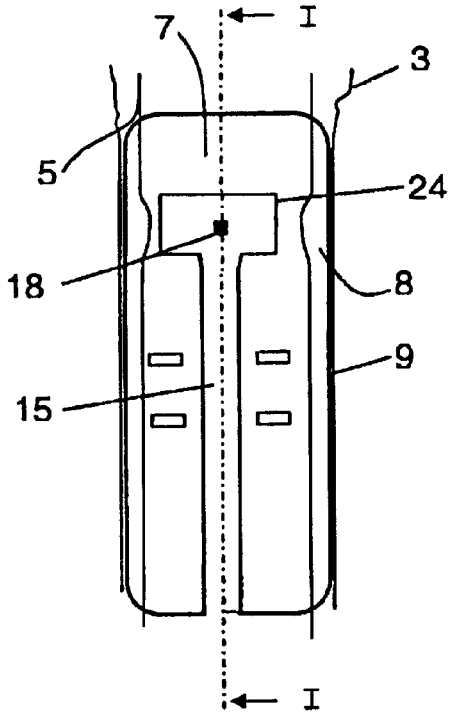
FIG. 1 is a frontal elevation view of the core expander of the perimetric expansion device of the machine.

The core expander 7 has an aperture 15 which, vertically and by way of a slot, extends from its base to an intermediate point, connecting the two frontal faces of the core expander and providing aforementioned core expander 7 with an inverted "U" shape, as shown in FIG. 1.

The aperture 15 permits the preventive welding means 16 to drag the two frontal faces 8 of the tubular mesh and the adjoining laminates 5 of thermally weldable material through the core expander 7, and to partly weld both frontal faces of the tubular mesh and the laminates of thermally weldable material 5, in such a way that both faces and laminates are all joined by a thermally welded zone 18.

As the aperture 15 is essentially vertical and when it stretches from the base of the core expander 7, the tubular mesh 3 and the laminates of thermally weldable material can be dragged downwards by the traction device 17 in spite of being joined, since the thermally welded zone 18 moves along the aperture 15 of the core expander.

Said preventive weld ensures that the frontal faces 8 of the tubular mesh and the laminates 5 of thermally weldable material advance or move along the core expander 7 and all of the shaping station 4, without one undergoing any movement as regards the other, both faces advancing equally when pulled by the traction means 17.

In the example in FIGS. 1 and 2, the cross section of the aperture 15 of the core expander 7 has a widening 24 at its far end which facilitates the working of the preventive welding means 16 through the aperture 15 of the core expander 7.

The bag shaping station 4 is also provided with welding devices 10 situated on both sides of the tubular mesh 3 and level with the core expander 7, below the preventive welding means 16.

These welding devices 10 permit the welding of each of the laminates 5 of thermally weldable material to the adjoining frontal face 8 of the tubular mesh 3.

In the example in FIG. 2, each welding device 10 is provided with two welders 10a arranged at the same level, for the making of respective cross-sectional welds for joining mesh-laminate.

In FIG. 2 it can be observed that the shaping station 4 is provided with a bag shaping device 11, below the core expander 7, which comprises a cross-sectional welding mechanism 12, which in turn is provided with at least two mutually facing welders, one to each side of the tubular mesh 3, adapted for thermally welding a bag bottom 13. Immediately below the cross-sectional welding mechanism 12, the bag shaping device 11 is equipped with a cross-sectional cutting mechanism 14, provided with two cutting knives which cut the tubular mesh 3 and the laminates of thermally weldable material, determining below said cut an unclosed mesh bag 2 and provided with a bottom 13, formed by the section of tubular mesh 3 and the laminates of thermally weldable material 5 dragged by the traction device 17 before the aforementioned cut occurs.

The traction device 17 of the machine in the example which pulls the tubular mesh 3 and the laminates 5 downwards, is made up of a pincer 25, adapted for holding the end of the tubular mesh provided with a bottom 13 at the height of the bag shaping device 17, which moves vertically when said pincer is assembled on a moving carriage 26.

When the tubular mesh 3 and the laminates 5 is cut, the section of mesh provided with a bottom that shapes a new bag 2 is held by first conveyor means 20, which convey the new bag towards a second filling station 21, wherefrom second conveyor means 22 subsequently convey it to a third closing station 23.

Figure 3:
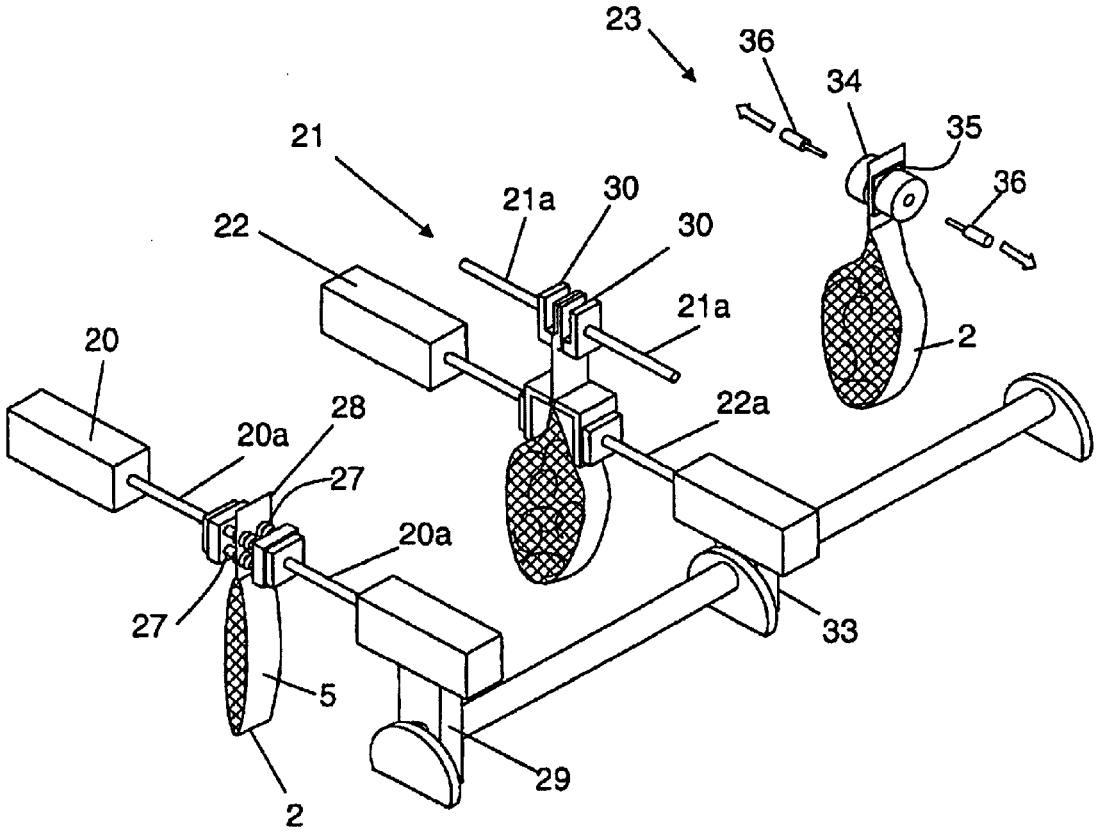
FIGS. 3, 4 and 5 are different perspective views of the filling and closing stations of the machine and the bag conveyor means, wherein its different operating stages can be observed.

In FIG. 3 it can be observed how the first conveyor means 20 hold a bag 2 just shaped by the bag shaping station 4 of the machine. At the same time, the mesh bag manufactured in the preceding operating cycle is in the second filling station 21 with products in its interior and held by second conveyor means 22, which will take care of conveying it to the third closing station 23. Also, at the same time, in the third station 23, the bag manufactured two operative cycles earlier has been closed and its upper mouth 28 welded, so the filled bag is ready for dispatch.

Said first conveyor means 20, consist of a pair of arms 20a which, arranged on both sides of the bag 2, hold it by means of suction cups 27 provided on their ends.

The arms 20a are supported on a horizontally moving carriage 29, and, in addition, said arms are capable of separating and joining together, so that on separating, as the suction cups are adhered to the laminates 5 and the latter are welded to the tubular mesh, they open the upper mouth 28 of the mesh bag 2. This situation is reflected in FIG. 4, wherein the first conveyor means 20 convey the mesh bag 2 towards the second filling station 21.

When the bag is conveyed to the second station 21, the arms 21a separate and return to the shaping station 4 in order to pick up the next bag, so the first conveyor means make an alternative back and forth movement between the shaping station 4 and the second filling station 21.

Figure 5:
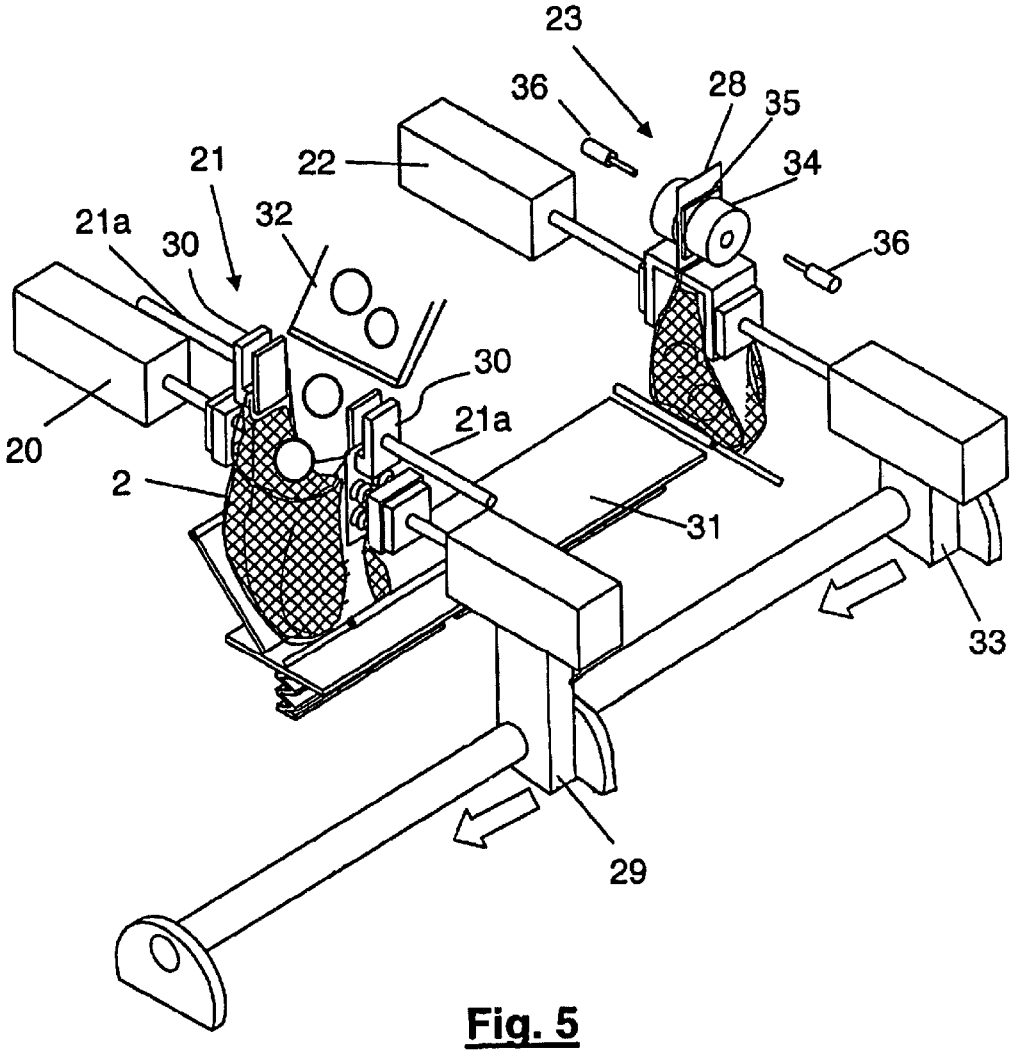

In said second station 21, a second pair of arms 21a, capable of separating and joining together and each provided with a pincer 30, will hold the bag 2 and will keep it open while filling means 32 insert the products to be packaged in the bag interior. This situation is shown in FIG. 5, wherein it is also illustrated that the machine is provided with lower support means 31 for the bag, so that the latter does not have to bear the weight of the products while it is supported by the pincers or conveyed towards the third station 23.

In the example in the figure, the lower support means 31 consist of a horizontally arranged tray which stretches underneath the second station 21 and the third station 23, below which the tray is provided with a ramp by which the bag, when filled and closed in the third station 23, falls by gravity. There is also the possibility that the machine is provided with at least one tilting trapdoor arranged under the upper mouth 28 of the bag 2, in order to avoid the products from falling from too great a height from the filling means 32 to the bottom 13 of the bag or to the lower tray.

It is also possible for the lower support means 31 to be comprised of a conveyor belt which conducts the product to the exit.

Once the bag is full, the second pair of arms 21a which hold the bag in the second station 21 join together, closing the upper mouth 28 of the bag, and the second conveyor means 22 hold the bag 2. These second conveyor means 22 consist of third arms 22a, also capable of separating and joining together which hold by pressure, when they join together, the bag 2 and convey it to the third station 23. For this, the third arms 22a are assembled on a horizontally moving carriage 33.

When the bag is conveyed to the third station 23, the arms 22a separate and return to the second station 21 in order to pick up the next bag, so the second conveyor means make an alternative back and forth movement between the second filling station 21 and the third closing station 23.

In the third station 23, a bag closing device takes care of closing the upper mouth 28 of the bag. This device comprises a tightening mechanism made up of two essentially flat plates 35, which pinch and hold the bag 2, the upper mouth of which is closed. Next, a welding mechanism 34, provided with one or several welders, takes care of welding the upper mouth 28 of the bag 2, thermally welding the laminates 5 and the tubular mesh 3 of the upper bag zone.

Once the upper mouth 28 of the bag 2 is welded, the welders of the welding mechanism 34 draw back, although the plates 35 carry on pressing and holding the bag until the thermally welded zone cools enough to guarantee a correct closure.

Figure 4:
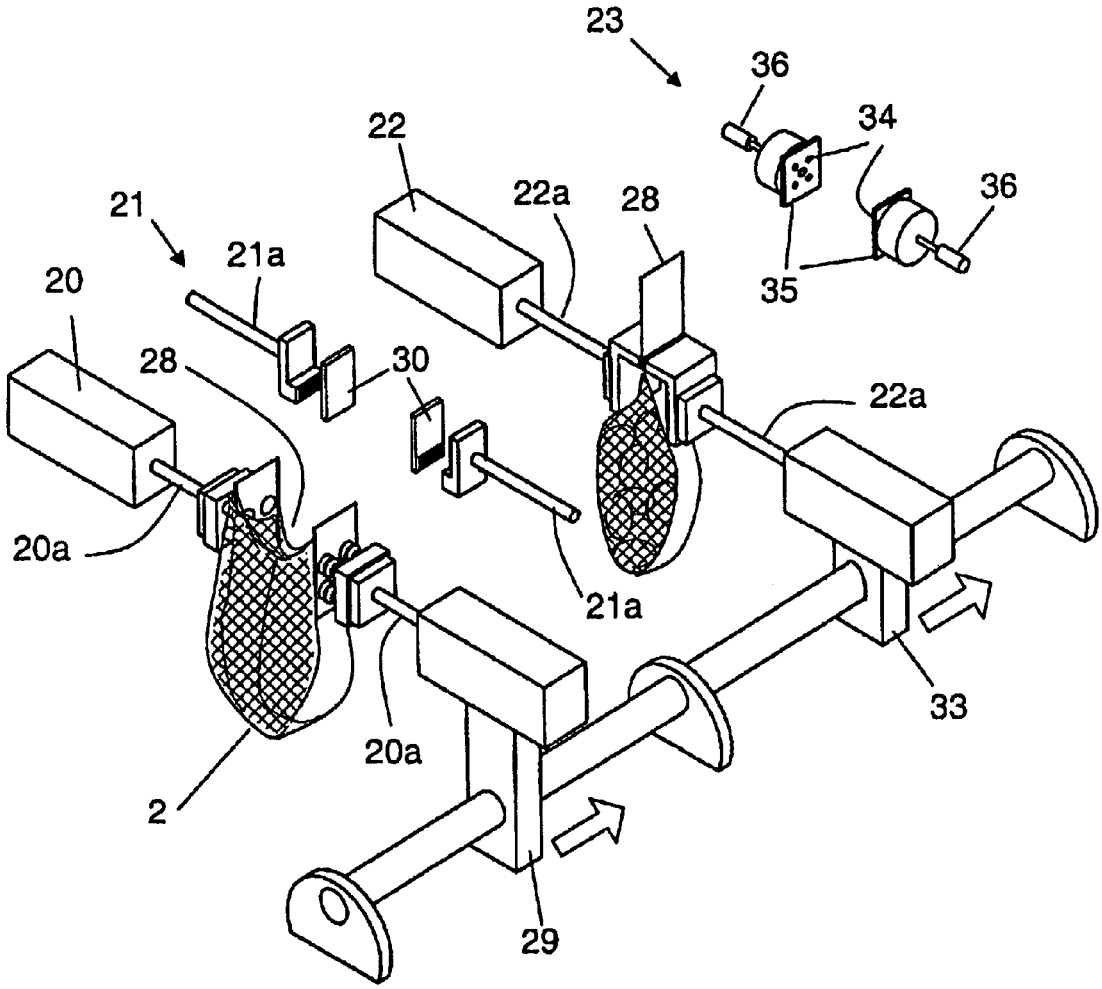

As indicated in FIGS. 3 to 5, the welding mechanism 34 can also be provided with a die mechanism 36, which acts when the upper mouth 28 of the bag 2 is held by the plates 35, acting through the aforementioned plates and trimming the laminates 5 and the tubular mesh 3 in order to facilitate the subsequent holding of the bags.

The invention claimed is:

1. Machine for manufacturing mesh bags (2) from a continuous roll of tubular mesh (3), preferably obtained from a reel, and for filling and closing said mesh bags, which comprises a first bag-shaping station (4), provided with:

tubular mesh continuous feed devices and first and second laminates (5) of thermally weldable material;

a perimetric expansion device (6) of the tubular mesh provided with a core expander (7) with an essentially oblong and flattened configuration, to be inserted, floating and vertically, inside the tubular mesh (3), determining in said mesh as it passes through the core expander, two frontal faces (8) and two lateral faces (9), and the first and the second laminates (5) of thermally weldable material face and superimpose said frontal faces of the tubular mesh;

welding devices (10) arranged on both sides of the tubular mesh (3) for the welding of each of the laminates (5) of thermally weldable material to the face adjacent to the tubular mesh; and a bag-shaping device (11), equipped with a cross-sectional welding device (12) to configure a bag bottom and a cross-sectional cutting mechanism (14) arranged next to the cross-sectional welding mechanism, characterised in that the core expander (7) of the perimetric expansion device (6) is equipped with a vertical aperture (15) which, as if it were a slot, traverses the core expander and connects the two frontal faces thereof and extends from its base to an intermediate point, for which the core expander adopts an inverted "U" shape, the machine being fitted with preventive welding means (16), situated on a level with the core expander, adapted for partially welding the two frontal faces (8) of the tubular mesh (3) and the adjoining laminates (5) of thermally weldable material through the said aperture [(5)] (*15*) of the core expander (7); and in that the first station (4) comprises a traction device (17) which stretches the mesh downwards, so the thermally welded zone (18) of the two frontal faces of the mesh moves along the core expander (7) aperture (15), dragging a section of the tubular mesh provided with a bottom (13) so that the tubular mesh and laminates of thermally weldable material adjoining are cut by the cutting mechanism (14), turning out an unclosed mesh bag (2) which is delivered to [the] *a* first conveyor means (20) which convey it towards a second filling station (21), wherefrom [the] *a* second conveyor means (22) subsequently convey it to a third closing station (23), both being arranged linearly.

2. Machine according to claim 1, characterised in that the cross section of the aperture (15) in a vertical direction of the core expander (7) has a wider part (24) at its far end.

3. Machine according to claim 1, characterised in that each of the welding devices (10) arranged on both sides of the tubular mesh (3) is provided with at least two welders (10a) arranged cross-sectionally and at the same level as regards the tubular mesh, in order to carry out the respective cross-sectional welds.

4. Machine according to claim 1, characterised in that the traction device (17) which stretches the tubular mesh (3) downwards is made up of a pincer (25), adapted for holding the end of the tubular mesh provided with a bottom, said pincer being assembled on a carriage, displaceable in a vertical direction (26).

5. Machine according to claim 1, characterised in that the first conveyor means (20) consist of a pair of arms (20a) arranged on both sides of the section of tubular mesh provided with a bottom and which constitutes a mesh bag (2) after being cut by the cross-sectional cutting mechanism (14), said arms being capable of joining together or separating and each of them being provided with at least one suction cup (27), so that when the arms (20a) join together said suction cups adhere to the thermally weldable laminates (5) of both faces of the bag (2), and when the arms separate the suction cups open the upper mouth (28) of the bag, and the arms are assembled on a carriage, displaceable in a horizontal direction (29), which makes an alternative movement between the first bag shaping station (4) and the second filling station (21), then, as the arms convey the bag towards the second station, the arms separate, thereby opening the upper mouth of the bag.

6. Machine according to claim 1, characterised in that the second filling station (21) comprises: a pair of arms (21a), a lower support means for the mesh bag (31), and a baa filling means (32) filling the mesh bag by its open upper mouth (28);

wherein said pair of arms (21a) are capable of joining together and separating, each of them provided with a pincer (30) to hold one of the walls of the mesh bag (2) provided with thermally weldable laminate (5); said pair of arms keeping the mesh bag open when the arms are separated.

7. Machine according to claim 1, characterised in that the second conveyor means (22) consist of third arms (22a), capable of separating and joining together and adapted for holding by pressure, when joined together, the mesh bag (2) of the second filling station (21), said arms being arranged below the second arms (21a) of the second filling station (21) and the arms also being assembled on a second carriage displaceable in a horizontal direction (33), which makes an alternative movement between the second filling station and the third closing station (23).

8. Machine according to claim 1, characterised in that the third closing station (23) comprises a bag closing device, provided with a welding mechanism (34) of the tubular mesh (3) and the laminates of thermally weldable material (5) adjoining the tubular mesh which constitute the mesh bag (2).

9. Machine according to claim 8, characterised in that the welding mechanism (34) of tubular mesh is provided with a tightening mechanism made up of two essentially flat plates (35) which pinch and press the mesh bag (2) mouth (28) before, during and after the welding of the tubular mesh (3) and laminates of thermally weldable material (5).

10. Machine according to claim 8, characterised in that the bag closing device comprises a die mechanism (36), adapted for trimming the laminates of thermally weldable material (5) and the welded tubular mesh (3) to facilitate the holding of the bags (2).

11. Machine according to claim 8, characterised in that the bag closing device (23a) comprises a mechanism adapted for providing the bag with a handle.

*12. A machine for continuously manufacturing mesh bags, comprising:*

*a perimetric expansion device with a core expander arranged floating and vertically inside a continuous tubular mesh, forming two frontal faces and two lateral faces on the tubular mesh;*

*a first and a second laminate of thermally weldable material superimposed over the two frontal faces of the tubular mesh;*

*a traction device that pulls the tubular mesh and the first and second laminates over the core expander;*

*a cross-sectional welding mechanism located after the core expander that cross-sectionally welds the two frontal faces of the tubular mesh and adjoining first and second laminates; and*

*a cross-sectional cutting mechanism located below the cross-sectional welding mechanism that cuts the tubular mesh and adjoining first and second laminates which forms an open bag with a bag bottom;*

*wherein a vertical aperture traverses the core expander extending vertically from the base of the core expander to an intermediate point in the core expander connecting the two frontal faces of the tubular mesh and the first and second laminates;*

*wherein a welding device is aligned with the aperture of the core expander to partially weld the two frontal faces of the tubular mesh and the adjoining first and second laminates;*

*wherein the cross section of the aperture aligned with the vertical direction of the core expander is wider at its top end.*

*13. A machine according to claim 12, further comprising additional welding devices situated on both sides of the core expander after the welding device that partially welds the first and second laminates to the adjoining frontal face of the tubular mesh.*

*14. A machine according to claim 12, wherein the core expander has an oblong and flattened shape.*

*15. A machine according to claim 12, wherein the traction device comprises a pincher configured to hold the bag bottom, the pincher being assembled on a carriage and displaceable in a vertical direction.*

* * * * *